United States Patent [19]

Takada et al.

[11] Patent Number: 5,093,796
[45] Date of Patent: Mar. 3, 1992

[54] AUTOMATIC PROGRAMMING DEFINITION OF A MACHINING CONFIGURATION FOR A NUMERICAL CONTROL DEVICE

[75] Inventors: Masayuki Takada; Akihiko Koide, both of Aichi, Japan

[73] Assignee: Mitsubishi Denki K.K., Tokyo, Japan

[21] Appl. No.: 701,011

[22] Filed: May 13, 1991

Related U.S. Application Data

[63] Continuation of Ser. No. 374,798, Jul. 3, 1989, abandoned.

[30] Foreign Application Priority Data

Jul. 4, 1988 [JP] Japan .................. 63-166205

[51] Int. Cl.⁵ .................. G05B 9/02; G05B 19/42
[52] U.S. Cl. .................. 364/474.22; 364/188; 364/192
[58] Field of Search .................. 364/188–192, 364/474.22–474.27

[56] References Cited

U.S. PATENT DOCUMENTS

| | | | |
|---|---|---|---|
| 4,555,590 | 11/1985 | Kishi et al. | 364/190 |
| 4,556,957 | 12/1985 | Ichikawa | 364/171 |
| 4,660,148 | 4/1987 | Kishi et al. | 364/188 |
| 4,700,290 | 10/1987 | Ichikawa | 364/191 |
| 4,792,889 | 12/1988 | Krägelin et al. | 364/474.24 |
| 4,928,221 | 5/1990 | Belkhiter | 364/191 |

FOREIGN PATENT DOCUMENTS 59-41011  3/1984  Japan .
60-156110 1/1985  Japan .
60-31610  2/1985  Japan .

*Primary Examiner*—Jerry Smith
*Assistant Examiner*—Jim Tramell
*Attorney, Agent, or Firm*—Sughrue, Mion, Zinn, Macpeak & Seas

[57] ABSTRACT

In a numerical control data forming system for a numerical control unit which is operated with a display unit and a data inputting unit, and has an automatic programming function to form machining data for a machine tool, the automatic programming function includes the operation that, in defining a machining configuration, the coordinates of a temporary last point are inputted, and the coordinates of an actual last point are automatically calculated, whereby numerical control data can be readily formed.

6 Claims, 2 Drawing Sheets

AUTOMATIC PROGRAMMING DEFINITION OF A MACHINING CONFIGURATION FOR A NUMERICAL CONTROL DEVICE

This is a continuation of application Ser. No. 07/374,798, filed July 3, 1989, and now abandoned.

BACKGROUND OF THE INVENTION

This invention relates to a numerical control data forming method in which an automatic programming function is used to readily achieve definition of a machining configuration (or pattern).

A conventional numerical control unit having an automatic programming function is as shown in FIG. 2. In FIG. 2, reference numeral 1 designates a display unit for displaying characters, symbols or graphics; 2, a data input unit for inputting numerical data and characters; 3, an automatic programming unit for forming a machining program; and 4, a numerical control unit for controlling a machine tool according to a machining program. The automatic programming unit 3 carries out a machining configuration definition according to a machining drawing with the aid of the data input unit 2 and the display unit 1, to form a machining program 6. Let us consider the case where, as shown in FIG. 1, in an x-y coordinate system a segment L1 extend from a point PO (0, 0) to a point P1 (50, 0), an arc Cl which is extended from the point P1 to the intersection P2 (a, b) of a CCW (counterclockwise) arc which is described from the point P1 to a point P4 (10, 20) with a radius of 40 and a straight line passing through a point P3 (80, 50) at a gradient of +30° with respect to the x-axis, and a segment L2 extended from the point P2 (a, b) to a point P3 (80, 50) are defined as a machining configuration. With respect to this case, a conventional data inputting procedure with an automatic programming unit will be described with reference to the parts (a), (b) and (c) of the following Table (I):

FIG (figure): For a straight segment extended from the preceding terminal point, "1" is entered. For a CW (clockwise) arc, "2" is entered, and for a CCW (counterclockwise) arc, "3" is entered.

BEND: When a line is bent to the left with respect to the vector from the preceding terminal point, "1" is entered; and when it is bent to the right, "2" is entered.

ARC: When an arc is of less than 180°, "1" is entered; and when it is of 180° or more, "2" is entered.

X : The X-coordinate of the last terminal point of a line is entered. However, in the column "X" of the line 10, the x-coordinate of a configuration definition start point is entered.

Y: The y-coordinate of the last terminal point of a line is entered. However, in the column "Y" of the line 10, the y-coordinate of the configuration definition start point is entered.

R/θ: When a straight line is defined, its angle is entered, and when an arc is defined, its radius is entered.

I, J: When a straight line is defined, x and y vectors are entered; and when an arc is defined, the arc center coordinates (x, y) are entered.

In this case, when with a minimum number of data inputted, the definition of a terminal point is switched over to that of the next terminal point, an automatic determination function is carried out so that necessary data are automatically determined and entered in empty columns. When a contradiction occurs, the automatic programming unit outputs an error message.

In the data inputting procedure, first the coordinates (0, 0) of the point PO in FIG. 1 are entered, as a configuration definition start point, in the columns "X" and "Y" of the line 10. The next segment L1 is straight. Therefore, "1" is entered in the column "FIG" of the line 20, and the coordinates (50, 0) of the last terminal point of the segment L1 are entered in the columns "X" and "Y" of the line 20. Under this condition., the line 20

TABLE I

| LINE | FIG. | BEND | ARC | X | Y | R/θ | I | J |
| --- | --- | --- | --- | --- | --- | --- | --- | --- |
| (a) | | | | | | | | |
| 10 | | | | 0 | 0 | | | |
| 20 | 1 | | | 50 | 0 | 0 | | |
| 30 | 3 | 1 | 1 | 10 | 20 | 40 | 15.168 | −19.665 |
| 40 | | | | | | | | |
| (b) | | | | | | | | |
| 10 | | | | 0 | 0 | | | |
| 20 | 1 | | | 50 | 0 | 0 | | |
| 30 | 3 | 1 | 1 | | | 40 | 15.168 | −19.665 |
| 40 | | | | | | | | |
| (c) | | | | | | | | |
| 10 | | | | 0 | 0 | | | |
| 20 | 1 | | | 50 | 0 | 0 | | |
| 30 | 3 | 1 | 1 | 26.020 | 18.835 | 40 | 15.168 | −19.665 |
| 40 | 1 | 2 | | 80 | 50 | 30 | | |
| 50 | | | | | | | | |

The above-described Table (I) is a part of the machining configuration picture in the automatic programming unit. Necessary data are entered in the Table (I) for definition of the machining configuration. In the Table (I), the LINE column contains an identifier that identifies a separate line in the Table having data that corresponds to the terminal points of the configuration, respectively, and for each line identifier, the other columns indicate the history of the respective terminal point from its preceding terminal point. These columns are used as follows:

is switched over to the line 30 for data concerning the next segment. In this operation, the automatic determination function is activated so that a gradient of 0 is automatically entered in the empty column position "R/θ" of the line 20. The arc Cl is a CCW arc, and therefore "3" is entered in the column "FIG" of the line 30. The arc Cl is bent to the left at the point P1, and "1" is entered in the column "BEND" of the line 30. The arc Cl is a small arc, and therefore "1" is entered in the column "ARC". In addition, the coordinates (10, 20) of the point P4 are entered in the columns "X" and "Y", and the arc radius 40 is entered in the column "R/θ". Coordinates 10, 20 represent a temporary last point of the arc which will be changed when other configuration data is entered. Upon selection of the next line 40, the automatic determination function is performed, so that the coordinates (15.168, −19.665) of the point P5 in FIG. 1 are entered in the columns "I" and "J" of the line 30. Under this condition, the temporary data in the columns "X" and "Y" of the line 30 are erased, and the further data is entered in the line 40. Specifically, as the segment L2 is straight, and is bent to the right, "1" and "2" are entered in the columns "FIG" and "BEND" of the line 40, respectively. The coordinates (80, 50) of the last terminal point P3 of the segment L2 are entered in the columns "X" and "Y" of the line 40, and the gradient "30" is entered in the column "R/θ". Thereafter, a machining configuration definition completion instruction is applied to the automatic programming unit, as a result of which the coordinates of the point P2 are automatically determined and entered in the columns "X" and "Y" of the line 30 which previously has been emptied of temporary data.

In the conventional data inputting procedure with the automatic programming unit, as was described above, after the coordinates (10, 20) of the point P4 have been entered in the columns "X" and "Y" of the line 30, and the coordinates (I, J) of the center of the arc have been automatically determined, the temporary data in the columns "X" and "Y" of the line 30 must be erased. That is, the operation steps back, thus lowering the efficiency of work.

SUMMARY OF THE INVENTION

Accordingly, an object of this invention is to eliminate the above-described difficulty accompanying a conventional data inputting procedure with an automatic programming unit.

More specifically, an object of the invention is to provide a numerical control data forming system in which a machining configuration definition can be achieved with an automatic programming unit more readily.

The foregoing object and other objects of the invention has been achieved by the provision of a numerical control data forming system for a numerical control unit which is provided with a display unit for displaying characters, symbols and graphics, and a data input unit for inputting numerical values and characters, and has an automatic programming function to form machining data for a machine tool; in which, according to the invention, the automatic programming function includes an operation that, in definition of an arbitrary machining configuration, the coordinates of a temporary last point are inputted, and the coordinates of an actual last point are automatically calculated.

The nature, principle and utility of the invention will become more apparent from the following detailed description when read in conjunction with the accompanying drawings.

DETAILED DESCRIPTION OF THE INVENTION

An embodiment of this invention will be described with reference to the accompanying drawings.

Figure 1:
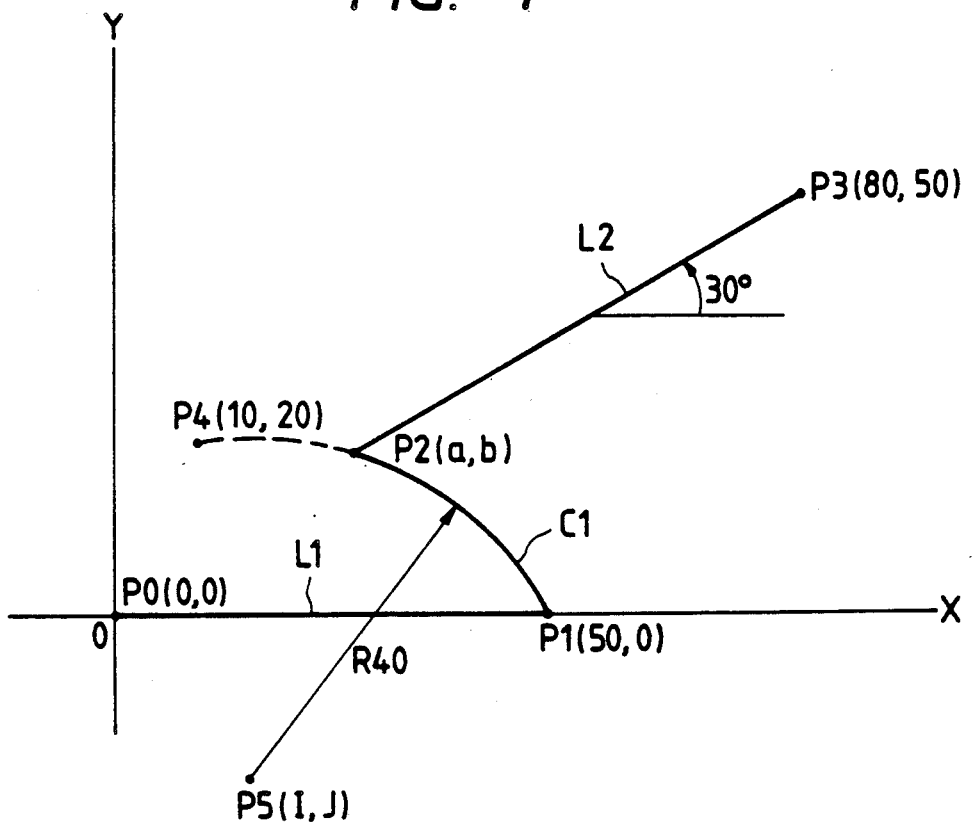
FIG. 1 is a coordinate diagram showing a machining configuration for a description of a conventional data inputting procedure with an automatic programming unit, and for a description of one example of a numerical control data forming method according to this invention.
Figure 2:
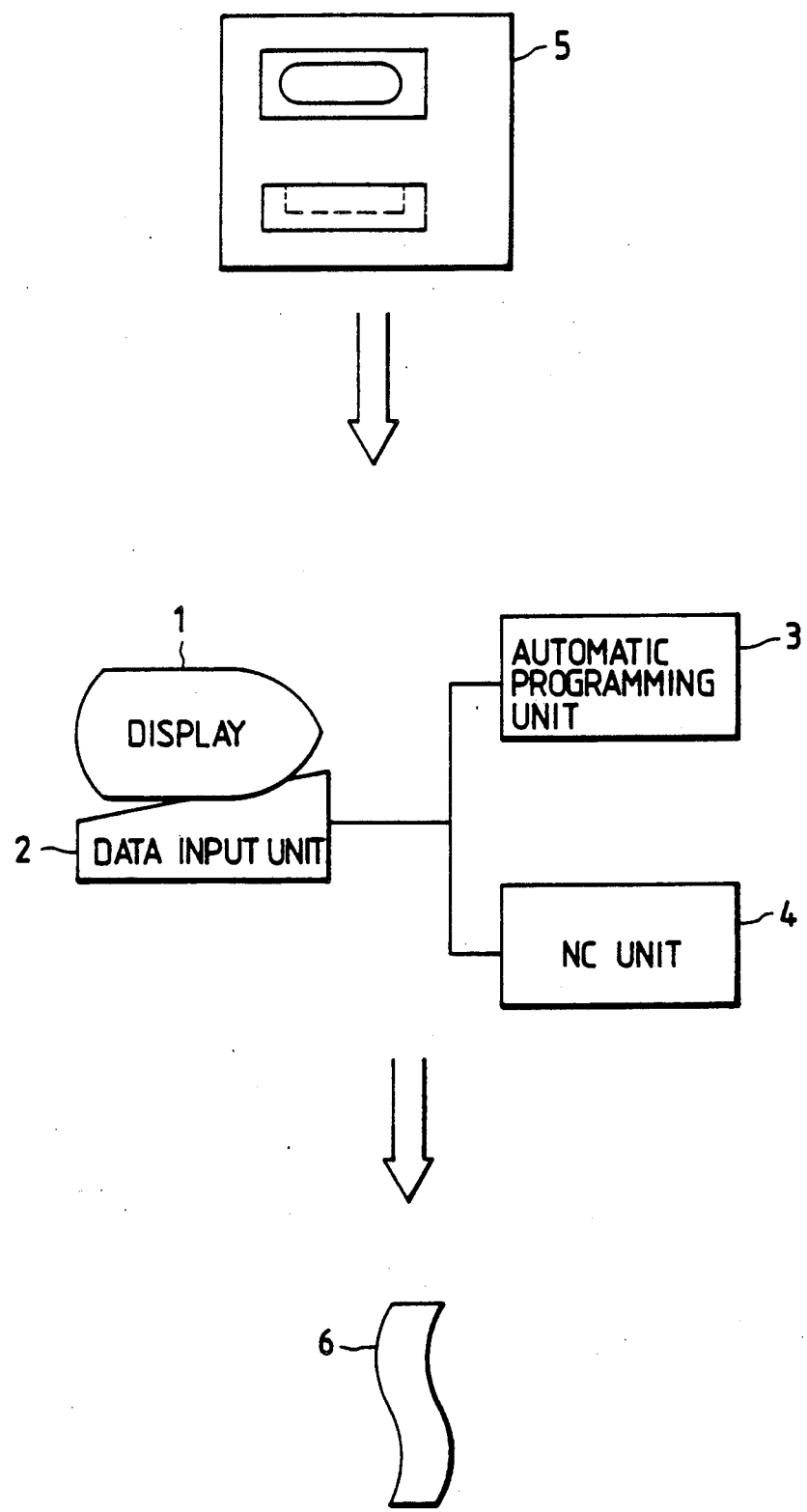
FIG. 2 is an explanatory diagram for a description of the numerical control data forming system in a numerical control unit having an automatic programming function.

Similarly as in the case of the prior art described above, let us consider the case where, as shown in FIG. 1, in an x-y coordinate system a segment L1 extended from a point PO (0, 0) to a point P1 (50, 0), an arc C1 which is extended from the point P1 to the intersection P2 (a, b) of a CCW (counterclockwise) arc which is described from the point P1 to a point P4 (10, 20) with a radius of 40 and a straight line passing through a point P3 (80, 50) at a gradient of +30° with respect to the x-axis, and a segment L2 extended from the point P2 (a, b) to point P3 (80, 50) are defined as a machining configuration. With respect to this case, a data inputting procedure with a programming unit according to the invention will be described with reference to the parts (a) and (b) of the following Table (II):

TABLE II

| LINE | FIG. | BEND | ARC | X | Y | R/θ | I | J |
|---|---|---|---|---|---|---|---|---|
| (a) | | | | | | | | |
| 10 | | | | 0 | 0 | | | |
| 20 | 1 | | | 50 | 0 | 0 | | |
| 30 | 3 | 1 | 1 | <10> | <20> | 40 | 15.168 | −19.665 |
| 40 | 1 | 2 | | 80 | 50 | 30 | | |
| 50 | | | | | | | | |
| (b) | | | | | | | | |
| 10 | | | | 0 | 0 | | | |
| 20 | 1 | | | 50 | 0 | 0 | | |
| 30 | 3 | 1 | 1 | 26.020 | 18.835 | 40 | 15.168 | −19.665 |
| 40 | 1 | 2 | | 80 | 50 | 30 | | |
| 50 | | | | | | | | |

The above-described Table (II) is a part of the machining configuration picture in the automatic programming unit. Necessary data are entered in the Table (I) for definition of the machining configuration. In the Table (II), the lines identified respectively by numbers 10–50 correspond to the terminal points of the configuration, respectively, and for each identified line, the columns indicate the history of the respective terminal point from its preceding terminal point. These columns are used as follows:

FIG (figure): For a straight segment extended from the preceding terminal point, "1" is entered For a CW (clockwise) arc, "2" is entered, and for a CCW (counterclockwise) arc, "3" is entered.

BEND: When a line is bent to the left with respect to the vector from the preceding terminal point, "1" is entered; and when it is bent to the right, "2" is entered.

ARC: When an arc is of less than 180°, "1" is entered; and when it is of 180° or more, "2" is entered.

X : The X-coordinate of the last terminal point of a line is entered. However, in the column "X" of the line 10, the x-coordinate of a configuration definition start point is entered.

Y: The y-coordinate of the last terminal point of a line is entered. However, in the column "Y" of the line 10, the y-coordinate of the configuration definition start point is entered.

R/θ: When a straight line is defined, its angle is entered, and when an arc is defined, its radius is entered.

I, J: When a straight line is defined, x and y vectors are entered; and when an arc is defined, the arc center coordinates (x, y) are entered.

In this case, when with a minimum number of data inputted, the definition of a terminal point is switched over to that of the next terminal point, an automatic determination function is carried out so that necessary data are automatically determined and entered in empty columns. Upon occurrence of a contradiction, the automatic programming unit outputs an error message.

In the data inputting procedure with the automatic programming unit according to the invention, first the coordinates (0, 0) of the point P0 in FIG. 1 are entered, as a configuration definition start position, in the columns "X" and "Y" of the line 10. The segment L1 is straight, and therefore "1" is entered in the column "FIG" of the line 20, and the coordinates (50, 0) of the point P1 are entered in the columns "X" and "Y". Then, the line 20 is switched over to the line 30. In this operation, the automatic determination function is carried out, so that a gradient of "0" is automatically determined and entered in the column "R/θ" of the line 20. The arc C1 is a CCW arc and is bent to the left at the point P1. Therefore, "3" and "1" are entered in the columns "FIG" and "BEND" of the line 30. The arc C1 is of less than 180°, and therefore "1" is entered in the column "ARC" of the line 30. The last terminal point P4 of the arc C1 is a temporary one, and therefore the coordinates (10, 20) of the point P4 are entered in the columns "X" and "Y" with brackets "< >". In addition, the arc radius of 40 is entered in the column "R/θ" of the line 30. Upon selection of the line 40, the automatic determination function is performed, so that the coordinates (15.168, −19.665) of the point P5 are automatically entered in the columns "I" and "J" of the line 30. The segment L2 is straight, and is bent to the right at the point P2. Therefore, the "1" and "2" are entered in the columns "FIG" and "BEND" of the line 40. In addition, the coordinates (80, 50) of the point P3 are entered in the columns "x" and "Y" of the line 40, and the gradient of "30" of the segment L2 is entered in the columns "R/θ" of the line 40. Thereafter, a machining configuration definition completion instruction is applied to the automatic programming unit, as a result of which the data in the columns "X" and "Y" of the line 30 which has been entered for the temporary last point are automatically replaced by the data (26.020, 18.835) which are obtained through calculation.

In the above-described embodiment, the coordinates of the temporary last point are indicated with the brackets "< >" for identification. However, the same effect may be obtained by indicating them with others characters (i.e., underlines) or indicating them in different color.

Furthermore in the above-described embodiment, the data inputting operation is carried out with a point on the arc, the true last point of which is unknown, as the temporary last point. However, it goes without saying that, with a point on the straight line, the true last point of which is unknown, as a temporary last point, the data inputting operation can be carried out with the same effect.

As was described above, in the method of the invention, in defining a machining configuration with an automatic programming unit, the coordinates of a temporary last point are inputted as configuration data, and the coordinates of the actual last point are automatically calculated. Therefore, the machining configuration definition can be achieved with the automatic programming unit readily.

While there has been described in connection with the preferred embodiment of this invention, it will be obvious to those skilled in the art that various changes and modification may be made therein without departing from the invention, and it is aimed, therefore, to cover in the appended claims all such changes and modification as fall within the true spirit and scope of the invention.

What is claimed is:

1. A numerical control data forming system for use with a numerical control unit that is operative to control machine tools in response to actual control data, comprising:

a data input means for receiving input control data comprising actual data and temporary data, said input control data including numerical values and characters for said numerical control unit;

an automatic programming means for forming actual control data for a machine tool according to said actual and temporary data from said data input means; and a display means for displaying all data, including characters, symbols and graphics;

said data input means for further inputting temporary data with identifiers, having visually distinguishable characteristics, and said automatic programming means being operative to calculate actual control data according to said input control data, including said temporary data, so that actual control data replaces said temporary data and is displayed on said display means without the identifiers.

2. The system of claim 1 wherein said calculated actual data comprises data representing coordinates of the last terminal points of a machining locus of the machining tool.

3. The system of claim 1 wherein said distinguishable indications are brackets.

4. The system of claim 1 wherein said distinguishable indications are underlines.

5. The system of claim 1 wherein said display means display the unknown data with color indications.

6. In a numerical control data forming system for use with a numerical control unit that is operative to control machine tools in response to actual control data, a method of automatically programming the definition of a machining configuration and comprising the steps of:

(a) receiving input control data comprising actual data and temporary data, said input control data including numerical values and characters for said numerical control unit;
(b) automatically forming actual control data for a machine tool according to said input actual and temporary data from said data receiving step;
(c) displaying all data, including characters, symbols and graphics;
(d) inputting temporary data with identifiers, having visually distinguishable characteristics, and said automatic forming step (b) being operative to calculate actual control data according to said input control data, including said temporary data, so that actual control data replaces said temporary data and said replacing actual control data is displayed without the identifiers.

* * * * *